United States Patent [19]

Tsuji et al.

[11] Patent Number: 5,754,958
[45] Date of Patent: May 19, 1998

[54] METHOD OF SELECTING A RADIO BASE STATION IN A MOBILE COMMUNICATION

[75] Inventors: Toshiya Tsuji; Shoji Tanaka, both of Tokyo, Japan

[73] Assignee: NEC Corporation, Tokyo, Japan

[21] Appl. No.: 570,969

[22] Filed: Dec. 12, 1995

[30] Foreign Application Priority Data

Dec. 14, 1994 [JP] Japan .................... 6-310734

[51] Int. Cl.⁶ .................... H04Q 7/00; H04B 17/00
[52] U.S. Cl. .................... 455/436; 455/439; 455/67.1
[58] Field of Search .................... 455/33.2, 33.1, 455/54.1, 56.1, 34.1, 34.2, 67.1; 379/59, 60

[56] References Cited

U.S. PATENT DOCUMENTS

| | | | |
|---|---|---|---|
| 4,654,879 | 3/1987 | Goldman et al. | 455/33.2 |
| 4,881,271 | 11/1989 | Yamauchi et al. | 455/56 |
| 5,454,026 | 9/1995 | Tanaka | 455/33.2 |
| 5,504,939 | 4/1996 | Mayrand et al. | 455/34.2 |
| 5,613,205 | 3/1997 | Dufour | 455/33.2 |

FOREIGN PATENT DOCUMENTS

| | | |
|---|---|---|
| 63-103525 | 5/1988 | Japan . |
| 1-122219 | 5/1989 | Japan . |

*Primary Examiner*—Donnie L. Crosland
*Attorney, Agent, or Firm*—Foley & Lardner

[57] ABSTRACT

A method of selecting a radio base station (BS) in a mobile communication system adapting a plurality of voice coding methods is provided. This method reduces a probability of failure in allocating speech channel at the BS after having been selected. Each BS broadcasts the usage rate of the speech channel for each method through a control channel, in connection with speech channel groups which can be allocated. The MS selects a BS as a candidate to be connected, which is optimum in view of receiving state of the control channel and the usage rate of the speech channel, at the time of waiting state after having power put on or during hand-over operation.

5 Claims, 3 Drawing Sheets

METHOD OF SELECTING A RADIO BASE STATION IN A MOBILE COMMUNICATION

BACKGROUND OF THE INVENTION

1. Field of the Invention

The present invention relates to a method of selecting a radio base station in a mobile communication system, and, more particularly, to a method of selecting a suitable radio base station as a connection candidate at the time of call request origination by a mobile station in a mobile communication network such as a cellular-type mobile communication network.

2. Description of the Related Art

In a mobile communication system, the speech channel used for speech communication by a mobile station is allocated by a radio base station in accordance with a call request signal transmitted by the mobile station through a control channel. The mobile station selects such a control channel of radio base station as a connection candidate based on information broadcasted by each radio base station through the control channel. The mobile station initiates monitoring and selection of the control channel of radio base station immediately after the powered on, and repeats the operation in a predetermined interval in the waiting state of the mobile station. Also, the operation is performed even during the communication for the sake of speech channel switching over due to degradation of receiving condition of radio signals.

As for technical conditions for selecting a control channel of radio base station as a connection candidate, the receiving condition of the radio signal for the control channel is an important factor, and it has been a conventional practice to select a control channel whose electric field intensity is sufficient and stable in order to have a speech channel allocated firmly by the radio base station at the time of call request origination (related art method 1).

Furthermore, as disclosed in Japanese Patent Application Laid-open Publication No. Hei 1-122219, "Mobile Communication System" (Inventor: Yukiji Yananouchi), there is known a method which makes it possible to achieve a highly efficient allocation of speech channels by performing communication of the observation data of channel usage state, i.e., idle state of speech channels, between all of neighboring radio base stations situated within an interfering area of respective radio base stations (related art method 2).

On the other hand, in order to accommodate as many subscribers as possible and to achieve an effective utilization of radio frequencies, there has been recently developed a half-rate technology with respect to the coding rate of voice data, and it is expected that a system will be adopted in a near future, in which a full-rate method and a half-rate method are mixed. However, the two methods are not compatible with each other, due to difference in the voice data coding algorithm or error correction method. Therefore, in addition to a conventional management of radio channels, it will become necessary for the radio base stations to adopt a management of radio channels corresponding to a plurality of methods.

To cope with such a situation, as disclosed in Japanese Patent Application Laid-open Publication No. Sho 63-103525, "Communication Channels Allocation Method" (Inventors: Toru Tajima, Hiroshi Inaba, and Izumi Horikawa), there is known a method in which, for each of mobile station groups (for example, a group which can communicate only with the full-rate method, a group which can communicate with both the full-rate method and the half-rate method), a priority order is allocated in accordance with the order of selection of the speech channel group and, among the speech channel group, a channel which is not in use is allocated to improve the efficiency of the speech channel usage (related art method 3).

With the related art methods 1-3 explained above, the mobile station in any case selects a radio base station as a candidate to be connected, without knowing the idle state of the speech channels of each of the radio base stations. Therefore, even if a radio base station is selected by a mobile station, when all of the speech channels which the mobile station can or desires to use are being used, allocation of a speech channel performed at the radio base station after reception of a call request of the mobile station is failed and a call connection cannot be achieved.

Normally, a mobile station indicates to a user of the terminal that it is within a service area, when a control channel from a radio base station is orderly received and a radio base station as a candidate to be connected is thereby selected. Thus, in the case of the above situation, there arises a drawback that a call connection cannot be achieved even though the user of the mobile station imagines that the mobile station is within a service area.

SUMMARY OF THE INVENTION

The present invention solves such problem, and is intended to provide a method of selecting radio base station as a connection candidate for communication at the time of call origination and hand-over operation by a mobile station in a mobile communication system adapting a plurality of different methods of communication between a plurality of mobile stations and a plurality of radio base stations.

To attain such object, a method according to the present invention comprises steps of, broadcasting usage state of speech channels for each of the methods of communication to mobile stations through a control channel individually allocated to each of the radio base stations, scanning and monitoring each of control channels broadcasted by the radio base stations sequentially at the mobile station, classifying monitoring result of receiving state for each control channel into a plurality of ranks at the mobile station, identifying the usage state of speech channels for each of the methods at the mobile station, and selecting a radio base station as a candidate to be connected by combination of information of the identified usage state for required communication method and classified rank of receiving state of the control channel at the mobile station.

In the method of selecting a radio base station as a candidate to be connected, the present invention further comprises steps of, putting the first priority for selection on to combination of the usage state of speech channel for a method of communication required by the mobile station and classified rank of receiving state of the control channel, putting subsequent priorities for selection on to the usage rate of speech channel for other methods of communication required by the mobile station, and providing an out-of range indication when none of radio base station satisfies selecting conditions of the usage rate of speech channel and rank of receiving state.

DETAILED DESCRIPTION OF THE PREFERRED EMBODIMENTS

The present invention will be described in the following by referring to the attached drawings.

Figure 1:
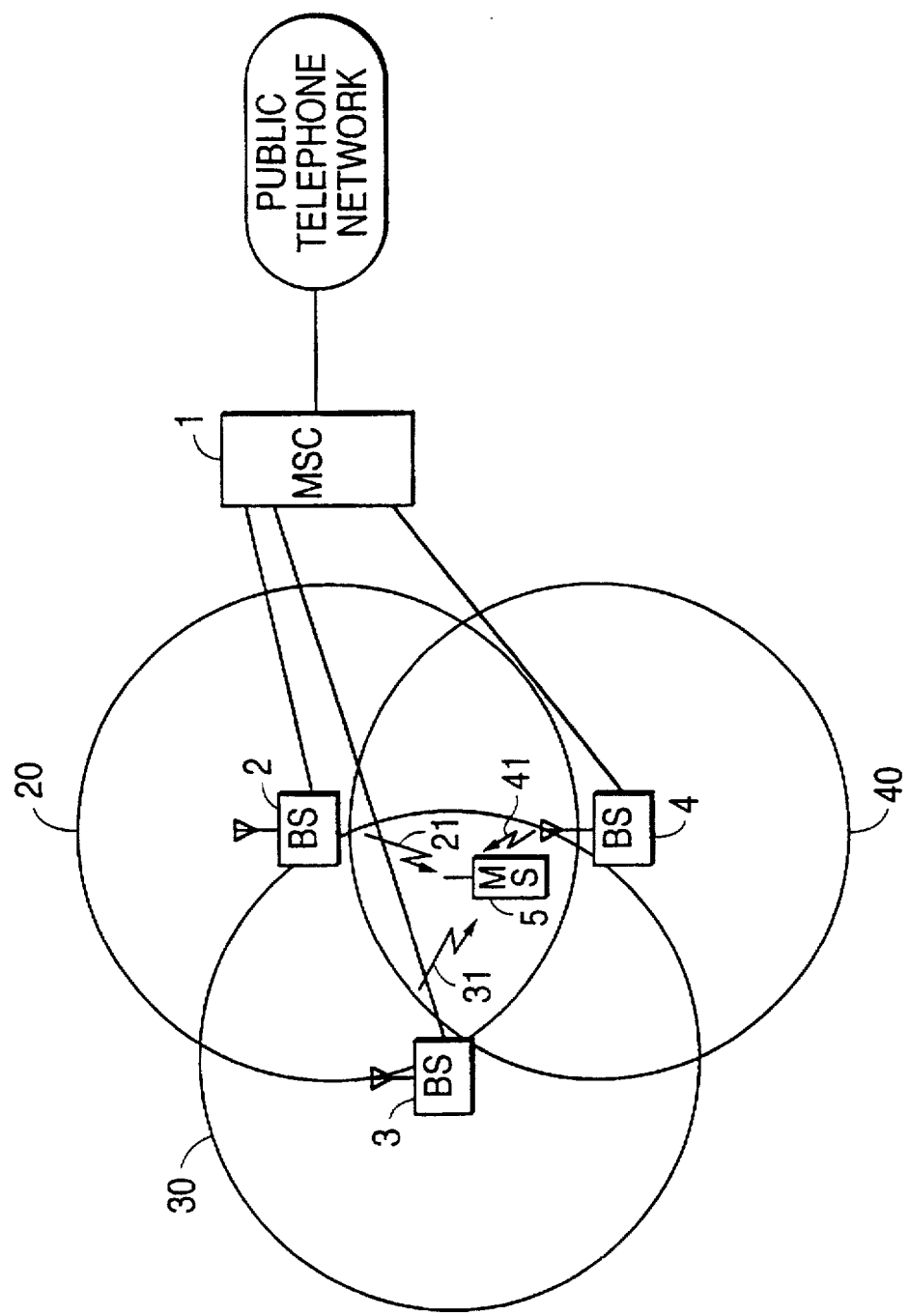
FIG. 1 is a schematic view showing an example of the constitution of a mobile communication system.

FIG. 1 is a schematic view showing an example of the constitution of a mobile communication system to which is applied the radio base station selecting method according to the present invention.

The mobile communication system shown in FIG. 1 is comprised of radio base stations (BSs) 2, 3 and 4 situated substantially at the centers of radio cells 20, 30 and 40, a mobile communication switching center (MSC) 1 to which these base stations are connected, and a mobile station (MS) 5, wherein the MSC 1 is connected to a public telephone network. Incidentally, an actual system is generally comprised of a greater number of BSs, though the basic constitution does not differ from what is shown in this figure.

The MSC 1 has a call switching control function and a BS management function, and performs a call connection for a MS. The BSs 2 to 4 have a transmission/reception function for radio channels corresponding to the full-rate method and a half-rate method, and perform radio communication with the MSs within the respective radio cell 20, 30 and 40. Incidentally, in each BS, the speech channels are assumed to be designated for the full-rate method and a half-rate method respectively.

The BSs 2 to 4 perform the management of speech channel groups respectively designated within the system, and broadcast the usage rate of the speech channel for each of the full-rate method and half-rate method through control channels 21, 31 and 41.

Figure 2:
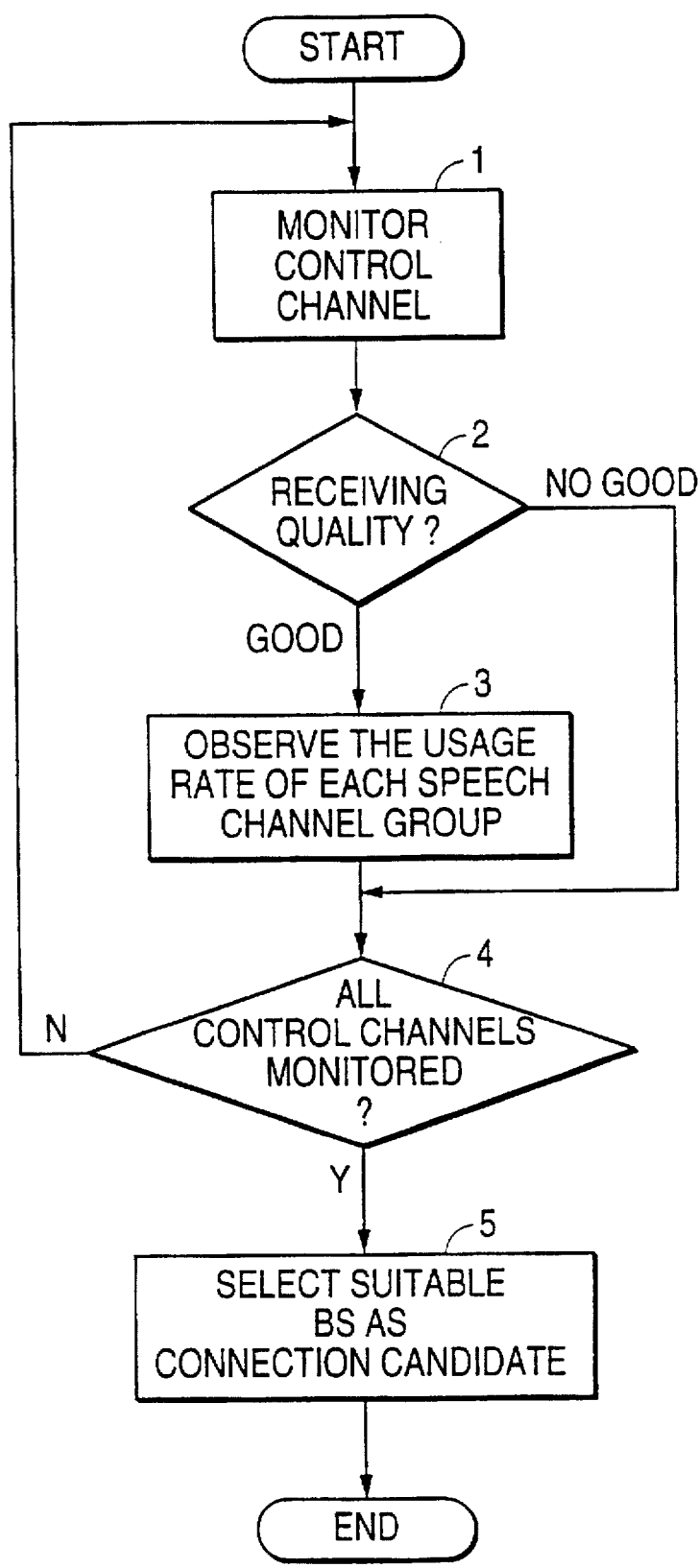
FIG. 2 is an operational flow chart showing the process of the method of radio base station selection according to the present invention with reference to FIG. 1.

In the next, referring to FIG. 2, explanation will be made of an operation with which the MS selects a BS among BSs 2 to 4 as a candidate to be connected.

First of all, the MS monitors each control channel one by one by receiving electric field level and checking the receiving quality. The MS monitors the control channel 21 transmitted by the BS 2 (step 1), and the receiving conditions are classified into ranks (step 2). For example, there may be set four ranks comprised of ranks 1 to 4 in the order of good quality, of which the ranks 1 to 3 are the ranks of the receiving conditions which are sufficient to perform radio communication, and the rank 4 corresponds to a receiving condition which is insufficient to perform radio communication. Incidentally, in the case of the rank 4, the check is shifted to the receiving condition of a subsequent control channel (step 2N).

In the case of ranks 1 to 3, the MS can observe the usage rate of channel for each speech channel group of the different voice coding method broadcasted by the control channel 21 (step 3). Therefore, it is possible to ascertain the usage rate of the speech channels of each group of the full-rate method and half-rate method, which is available for allocating in the BS 2.

The above operation is performed with respect to all the control channels within the system, such as the control channel 31 and the control channel 41 (step 4), and when all control channels have been monitored as described above, the operation shifts to the selection of the BS as a candidate to be connected (step 5).

Figure 3:
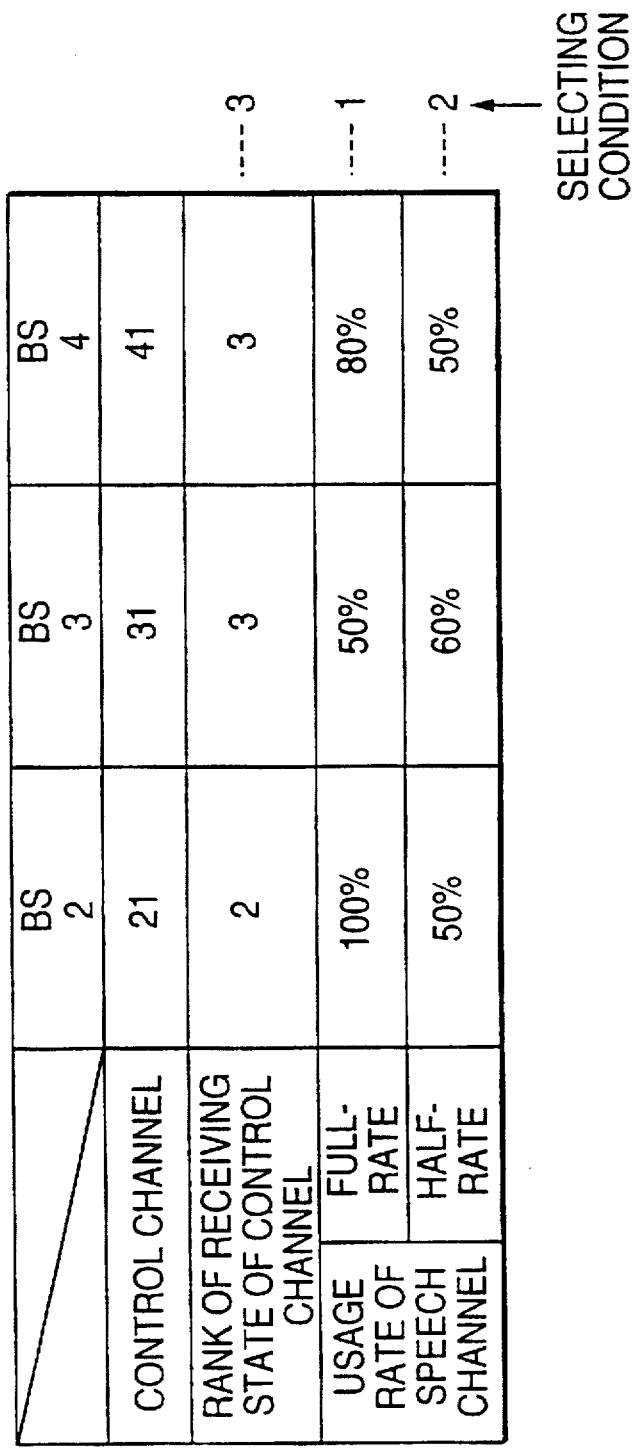
FIG. 3 is an example table showing the monitoring result data according to the present invention.

Explanation will now be made of the selection of the BS as a candidate to be connected, as performed by the MS in case when the monitoring results of the receiving state and information of each control channel broadcasted is as shown in FIG. 3. FIG. 3 shows the monitoring results stored in each MS, and it shows the control channel number, the rank of receiving state of control channel and the usage rate of speech channel of each of the full-rate method and the half-rate method for each of BS 2,BS 3 and BS 4, respectively. For example, the monitoring results for BS 3 are as follows:

the control channel number is 31;

the rank of receiving state of control channel is 3;

the usage rate of speech channel of the full-rate method is 50%; and the usage rate of speech channel of the half-rate method is 60%.

The selection method can be considered as a combination of the selecting conditions which are such as those shown below. That is, the selecting condition 1 is a usage rate of the speech channels adopting the full-rate method, selecting condition 2 is a usage rate of the speech channels adopting the half-rate method, and the selecting condition 3 is a reception condition of the control channels.

For example, when the priority is given to the mobile communication using the full-rate method, the selecting condition 1 has the first priority for deciding candidate BSs for selection, and then the selecting condition 3 is considered for selection as the second priority for deciding candidate BSs for selection. It means that the BS whose usage rate of the full-rate method is as lower as possible and the receiving state is as better as possible is selected. If there is no suitable BS for selection under above conditions, due to the usage rate of the full-rate method is 100% and the receiving state is rank 4, then the selecting condition 2 with the selecting condition 3 is applied for selection. If no suitable BS satisfies with all above conditions for selection, the MS provides an out-of range indication to notify the user that the communication is not available. Another alteration may be possible to provide an out-of range indication immediately after failing the selection in the first priority condition, that is the case where the usage rate of the full-rate method for all BSs is 100%.

Therefore, in the case of FIG. 3, the BS 2 is not selected as whose usage rate of the full-rate method is 100%, and then the BS 3 and BS 4 are selected as candidates based on selecting condition 1being the first priority. When the selecting condition 3 is applied then as the second priority for deciding candidate BSs selecting, it appears that both BS 3 and BS 4 have the same rank 3 in their receiving state. Therefore, the BS 3 having lower usage rate (50%) is selected as a final candidate.

Conversely, when a mobile communication using the half-rate method is given the priority, the BS 2 is selected, which has the lowest usage rate of 50% in the selecting condition 2 and the rank of receiving state in the selecting condition 3 is excellent (the rank 2).

When the conventional selecting method would be applied, the BS 2 having the best receiving state of the control channel would be selected even if the mobile communication with the full-rate method would be used, and it would fail to allocate a speech channel for the communication at the BS 2 as the usage rate of speech channel for the full-rate method is 100% (no idle channel available for allocation).

As explained above, according to the present invention, the MS is informed the usage rate of speech channel groups for each voice coding method in each BS, and selects an optimum BS in association with the receiving state of the control channel as a candidate BS to be connected. Therefore, the present invention provides a meritorious effect of reducing the probability of failure in allocating speech channels at the time of call origination by the MS and channel switching over during mobile communication due to degradation of receiving state at the MS. Also, as in the selecting method according to the present invention, when the MS selects among the BSs having the low channel usage rate, it is possible to provide another effect whereby the traffic can be distributed.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be construed as included therin.

What is claimed is:

1. A method of selecting a radio base station as a connection candidate for communication at a time of call origination and hand-over operation by a mobile station in a mobile communication system adapting a plurality of different methods of communication between a plurality of mobile stations and a plurality of radio base stations, said method comprising the steps of:

broadcasting usage state of speech channels for each of said methods of communication to said plurality of mobile stations through a control channel individually allocated to each of said radio base stations;

scanning and monitoring each of said control channels broadcasted by said plurality of radio base stations sequentially at said mobile station;

classifying monitoring result of receiving state for each control channel into a plurality of ranks at said mobile station;

identifying said usage state of speech channels for each of said methods at said mobile station; and selecting a radio base station as a candidate to be connected by a combination of information of said identified usage state for required communication method and said classified rank of receiving state of said control channel at said mobile station.

2. The method of selecting a base station according to claim 1, said step of selecting a radio base station as a candidate to be connected further comprising the steps of:

putting a first priority for selection based on a combination of said usage state of speech channel for a method of communication required by said mobile station and a classified rank of receiving state of said control channel;

putting subsequent priorities for selection based on said usage rate of speech channel for other methods of communication required by said mobile station; and providing an out-of-range indication when none of the radio base stations satisfies selecting conditions of said usage rate of speech channel and said classified rank of receiving state.

3. The method of selecting a radio base station according to claim 1, said step of selecting a radio base station as a candidate to be connected further comprising the steps of:

putting a priority for selection based on a combination of said usage state of speech channel for a method of communication required by said mobile station and a classified rank of receiving state of said control channel; and providing an out-of-range indication when none of the radio base stations satisfies selection condition of said priority.

4. The method of selecting one of a plurality of base stations according to claim 1, wherein the first method of communication corresponds to a full-rate method of communication, and wherein the second method of communication corresponds to a half-rate method of communication.

5. A method of selecting one of a plurality of radio base stations as a connection candidate for communication at a time of call origination and hand-over operation by a mobile station, in a mobile communication system capable of using at least a first method of communication and a second method of communication between the mobile station and the plurality of base stations, the method comprising the steps of:

broadcasting, by each base station, a control channel which includes information as to a first usage state of a first plurality of speech channels assigned to each base station and utilizing the first method of communication, and a second usage state of a second plurality of speech channels assigned to each base station and utilizing the second method of communication, each of the first plurality of speech channels assigned to the first method of communication being different from each of the second plurality of speech channels assigned to the second method of communication;

monitoring, by the mobile station, respective control channels broadcasted by each base station;

determining, by the mobile station, a level of reception of each of the respective control channels;

categorizing, into one of a plurality of categories, each of the respective control channels based on the determined level of reception;

determining, by the mobile station, the corresponding first usage state and the corresponding second usage state of each base station, based on the information in each of the respective control channels; and selecting, by the mobile station, the one radio base station based on the categorizing of each of the respective control channels and the information as to the corresponding first and the second usage states obtained from each of the respective control channels.

* * * * *